(12) United States Patent
Castagnet

(10) Patent No.: US 8,169,409 B2
(45) Date of Patent: May 1, 2012

(54) METHOD OF MANAGING A LANGUAGE INFORMATION FOR A TEXT INPUT AND METHOD OF INPUTTING A TEXT AND A MOBILE TERMINAL

(75) Inventor: Stephan Castagnet, Noisy-le-Grand (FR)

(73) Assignee: LG Electronics Inc., Seoul (KR)

( * ) Notice: Subject to any disclaimer, the term of this patent is extended or adjusted under 35 U.S.C. 154(b) by 1181 days.

(21) Appl. No.: 11/690,262

(22) Filed: Mar. 23, 2007

(65) Prior Publication Data

US 2008/0070604 A1  Mar. 20, 2008

(30) Foreign Application Priority Data

Sep. 18, 2006  (EP) .................................. 06291455

(51) Int. Cl.
*G09G 5/00* (2006.01)
(52) U.S. Cl. .................... 345/171; 345/168; 704/277
(58) Field of Classification Search ...... 704/9; 455/466, 455/550.1, 566; 345/168, 171
See application file for complete search history.

(56) References Cited

U.S. PATENT DOCUMENTS

| | | | |
|---|---|---|---|
| 6,477,494 B2 * | 11/2002 | Hyde-Thomson et al. ... | 704/260 |
| 6,496,570 B1 * | 12/2002 | Nimphius .................. | 379/88.25 |
| 6,512,448 B1 * | 1/2003 | Rincon et al. ................ | 340/7.51 |
| 6,597,345 B2 * | 7/2003 | Hirshberg ..................... | 345/168 |
| 6,600,919 B1 | 7/2003 | Kawase | |
| 6,839,421 B2 * | 1/2005 | Ferraro Esparza et al. ........................ | 379/220.01 |
| 6,854,074 B2 * | 2/2005 | McLellan et al. ............... | 714/39 |
| 7,027,582 B2 * | 4/2006 | Khello et al. ............ | 379/220.01 |
| 7,124,951 B2 * | 10/2006 | Hamilton et al. ........ | 235/472.01 |
| 7,551,162 B2 * | 6/2009 | Yu et al. ......................... | 345/168 |
| 7,685,114 B2 * | 3/2010 | Brunswig et al. ..................... | 1/1 |
| 7,825,901 B2 * | 11/2010 | Potera ........................... | 345/171 |
| 7,962,857 B2 * | 6/2011 | Plestid et al. .................. | 715/780 |
| 2004/0138869 A1 * | 7/2004 | Heinecke ........................... | 704/1 |
| 2005/0108017 A1 * | 5/2005 | Esser et al. ...................... | 704/277 |
| 2006/0074628 A1 * | 4/2006 | Elbaz et al. ....................... | 704/8 |
| 2006/0119583 A1 * | 6/2006 | Potera .......................... | 345/171 |
| 2007/0265828 A1 * | 11/2007 | Lorraine Scott et al. ......... | 704/9 |

FOREIGN PATENT DOCUMENTS

| | | |
|---|---|---|
| EP | 1480420 A1 | 11/2004 |
| WO | WO 2006125660 A | 11/2006 |

* cited by examiner

*Primary Examiner* — Talivaldis Ivars Smits
*Assistant Examiner* — Shaun Roberts
(74) *Attorney, Agent, or Firm* — Lee, Hong, Degerman, Kang & Waimey

(57) ABSTRACT

A text input for a messaging application is performed on the basis of the language stored respective to the input or the selected contact item in the memory.

32 Claims, 11 Drawing Sheets

METHOD OF MANAGING A LANGUAGE INFORMATION FOR A TEXT INPUT AND METHOD OF INPUTTING A TEXT AND A MOBILE TERMINAL

CROSS-REFERENCE TO RELATED APPLICATION

The present application claims priority from European Patent Application No. 06291455.1, filed 18 Sep. 2006, the entire contents of each is incorporated herein by reference.

BACKGROUND

1. Field of the Invention

The present invention relates to a method of managing language information for text input and a method of inputting text in a mobile terminal for the text input.

2. Description of the Related Art

In most current devices available on the market, the End User predefines the language to be applied in a 'predictive text' algorithm, such as 'T9,' or a standard editor algorithm, such as 'abc' mode, when using an application that relies on such an algorithm (e.g. 'Messaging application) and writing a new message (SMS, MMS, E-Mail or other type).

FIGS. 1a and 1b show schematically a sequence of displays illustrating all user operations in a messaging application of a conventional communication terminal.

A messaging application of a conventional communication terminal is shown in FIG. 1a and FIG. 1b. When the messaging application is started up, it waits for a key stroke, as shown in the first display of FIG. 1a. The functionalities of the three soft key labels below are 'Options', 'Search' and 'Send'.

When pressing the 'Search' soft key, the user is offered a list of user names, as shown in the second display of FIG. 1a. The functionalities of the three soft key labels change from 'Options', 'Search' and 'Send' to 'Select', 'Mark' and 'Done'. The user can scroll through the list of user names from the beginning by pressing the up/down navigation key directly. Once the user has found the required entry and pressed the 'Mark' soft key, the required entry is selected, as shown in the third display of FIG. 1a.

When pressing the 'Done' soft key, the selected name 'French_Name2' is entered into the address area, as shown in the forth display of FIG. 1a.

Often, when pressing the 'Options' soft key in the forth display of FIG. 1a, the user is offered a list of actions such as 'Insert', 'Dictionary', 'Send message', 'Save to draft' and 'Exit,' as shown in the first display of FIG. 1b. The user can scroll through the actions from the beginning by pressing the up/down navigation key directly.

Once a user moves the scroll bar to a desired item, for example, 'Dictionary,' and presses the 'Select' soft key, the user is offered a list of dictionaries, such as 'Dictionary off', 'French', 'English', 'German', 'Italian', 'Spanish' and 'Dutch', with a default dictionary set to 'English,' as shown in the second display of FIG. 1b. The user can scroll through the list of dictionaries from the beginning by pressing the up/down navigation key directly.

Once a user moves the scroll bar to a desired language, for example, 'French,' and presses the 'Select' soft key, the 'French' dictionary is selected, as shown in the third display of FIG. 1b.

When pressing the 'Select' soft key again, the message application appears with the current dictionary set to 'French,' as shown in the forth display of FIG. 1b. When starting to type a word in the message area, the user presses the key containing the desired letter once. For example, when pressing the keys containing 'B', 'O', 'N', 'J', 'O', 'U' and 'R' once in 'T9' mode, or sometimes until the letter is displayed in 'abc' mode, the user can type the word 'Bonjour'

Therefore, in case of a messaging application, when a new message or a reply to an existing contact available in the phonebook has to be written, the End User has to 'manually' reselect the relevant T9 language or standard language to be applied as the default language because the device is reset when the user exits the Messenger client.

SUMMARY

Accordingly, the present invention has been made to solve the above-mentioned problems occurring in the related art.

Additional advantages, objects and features of the invention will be set forth in part in the description which follows and in part will become apparent to those having ordinary skill in the art upon examination of the following or may be learned from practice of the invention.

In one aspect of the present invention, there is provided a method of managing a language for a text input. The menu for managing the language for the text input on a display is displayed. The language respective to each of a plurality of users is selected from the menu with or without intervention by the user. A contact item comprising the user name and the selected language is stored in the memory. The contact item comprises the user name. The selected language is applicable to the text input for the user.

By the way, the language is the predictive text algorithm's language so that the changing of the predictive text algorithm's language causes the predictive text algorithm to run in the new language. Also, the predictive text algorithm generates the text comprising words matching an input string of key strokes, which allows the user to enter the words with only one keystroke per letter.

In another aspect of the present invention, there is provided one method of inputting text.

In this method, a plurality of contact items and a language respective to each of the contact items is stored in a memory. Each of the contact items comprises a user name and a messaging address necessary for a messaging application. At least one of the contact items is input or selected via one of the user name or the messaging address in the memory. Text inputting for the messaging application is performed on the basis of the language stored respective to the input or the selected contact item in the memory.

In another aspect of the present invention, another method of inputting text is provided.

In this method, a contact item, which comprises a user name and a messaging address necessary for a messaging application, is stored in a memory. The messaging application, which comprises an address and a text inputting window, is displayed on the display. Also, at least some of the messaging address of the contact item stored in the memory is selected or at least some of the messaging address stored or not stored in the memory is input into the address inputting window of the messaging application.

In another aspect of the present invention, a mobile terminal for inputting text is provided.

The mobile terminal comprises a memory, an input device and a controller. The memory stores a plurality of contact items and a language respective to each of the contact items, wherein each of the contact items comprises a user name and a messaging address necessary for a messaging application. The input device inputs or selects at least one of the contact items via one of the user name or the messaging address in the memory. The controller is configured to perform a text input for the messaging application in accordance with the operation of the input device on the basis of the language stored respective to the input or the selected contact item in the memory.

In another aspect of the present invention, there is provided a mobile terminal for inputting text.

The mobile terminal comprises a memory, a display, an input device and a controller. The memory stores a contact item, which comprises a user name and a messaging address necessary for a messaging application. The display displays the messaging application, which comprises an address and a text inputting window. The input device selects at least some of the messaging address of the contact item stored in the memory. The input device inputs at least some of the messaging address stored or not stored in the memory into the address inputting window of the messaging application. A controller is configured to perform a text input into the text inputting window of the messaging application in accordance with the operation of the input device on the basis of the language derived from the messaging address.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION

Figure 1A:
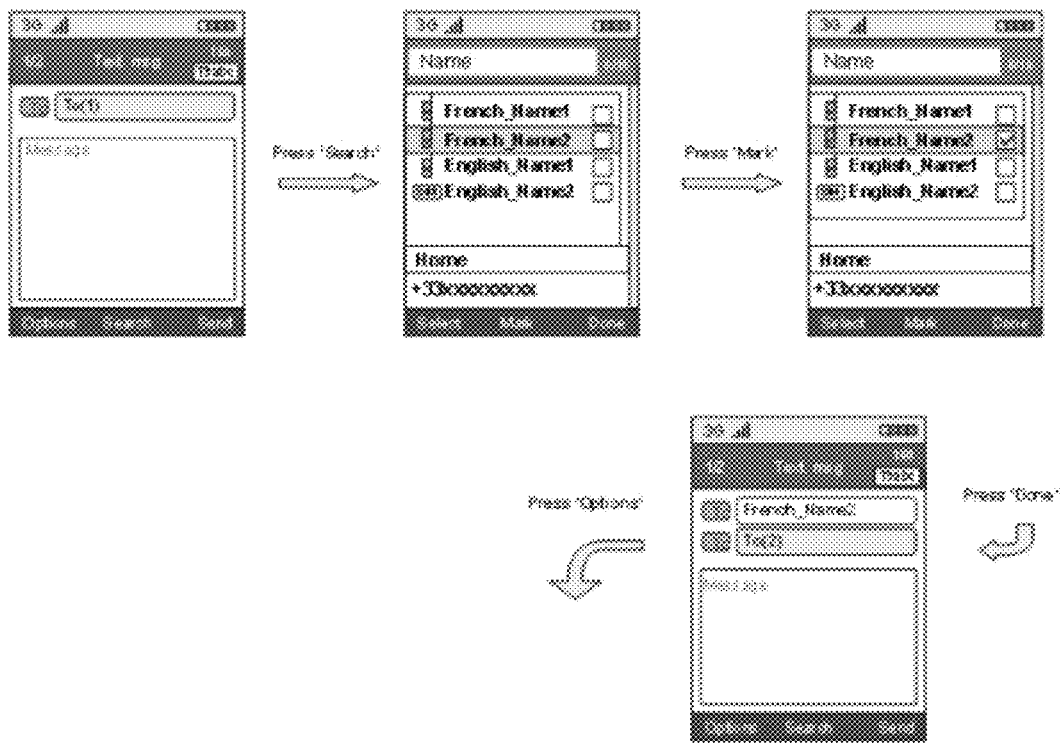
FIGS. 1a and 1b schematically show a sequence of displays illustrating all user operations in a messaging application of a conventional communication terminal.
Figure 1B:
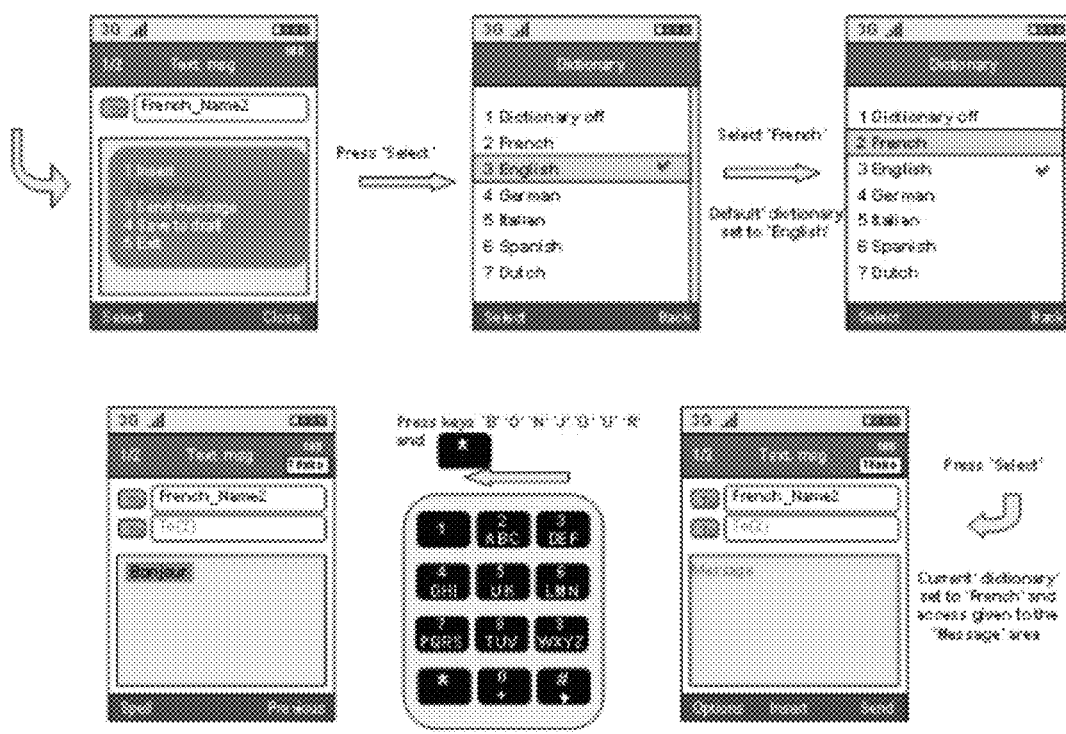

Hereinafter, the embodiments of the present invention will be described in detail with reference to the accompanying drawings. The aspects and features of the present invention and methods for achieving the aspects and features will be apparent by referring to the embodiments to be described in detail with reference to the accompanying drawings. However, the present invention is not limited to the embodiments disclosed hereinafter, but can be implemented in diverse forms.

The matters defined in the description, such as the detailed construction and elements, are nothing but specific details provided to assist those of ordinary skill in the art in a comprehensive understanding of the invention, and the present invention is only defined within the scope of the appended claims. In the entire description of the present invention, the same drawing reference numerals are used for the same elements in various figures.

Figure 2:
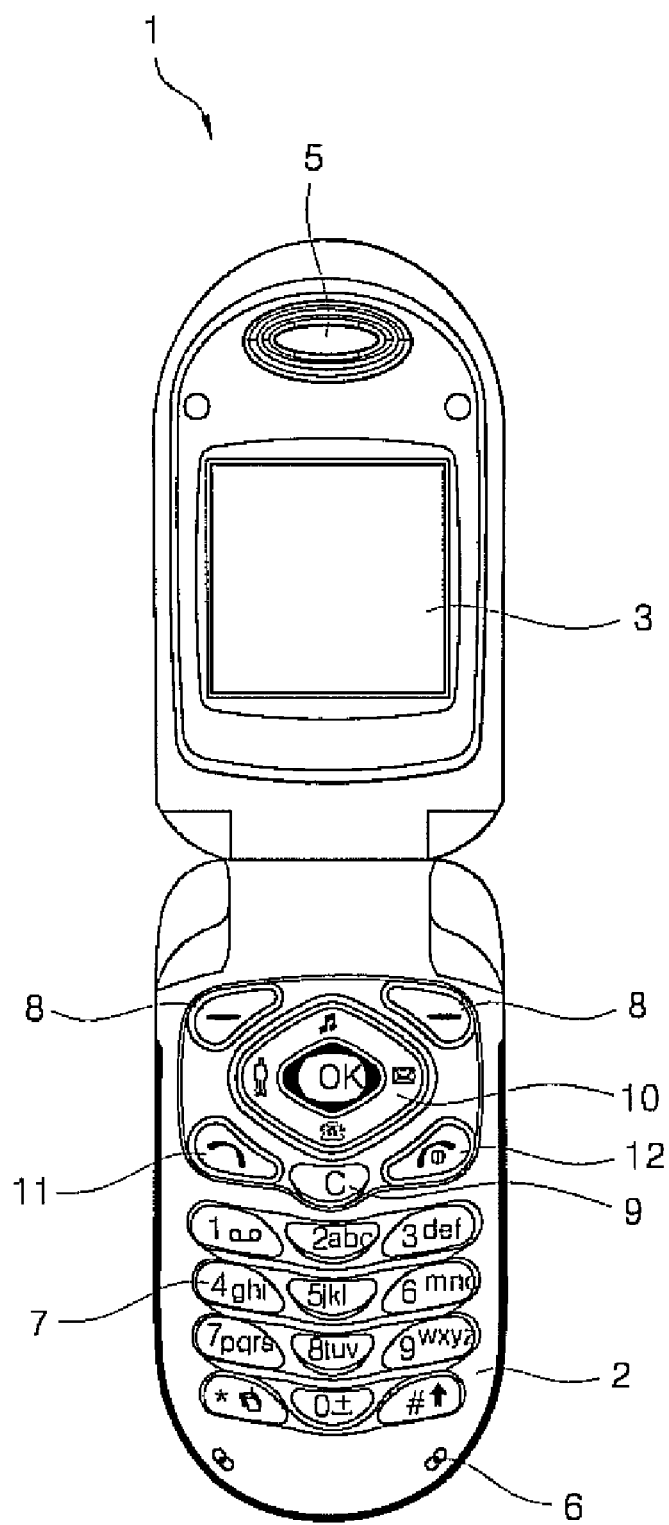
FIG. 2 schematically illustrates a communication terminal according to an embodiment of the invention.

FIG. 2 schematically illustrates a communication terminal according to an embodiment of the invention.

Referring to FIG. 2, it will be seen that the phone, which is generally designated by 1, comprises a user interface having a keypad 2, a display 3, a speaker 5 and a microphone 6. The phone 1 according to the embodiment is adapted for communication via a cellular network, but could have been designed for a cordless network as well.

According to the embodiment, the keypad 2 has a first group 7 of keys as alphanumeric keys, a left/right soft key 8, and a navigation key 10. Furthermore the keypad 2 comprises a 'clear' key 9, 'Send' key 11 and 'End/Power' key 12. The present functionalities of the soft key 8 is shown in a separate field in the display 3 just above the key 8.

A character or an icon from a character set corresponding to a selected language for a contact item is displayed in the display area on keypad 2.

Figure 3:
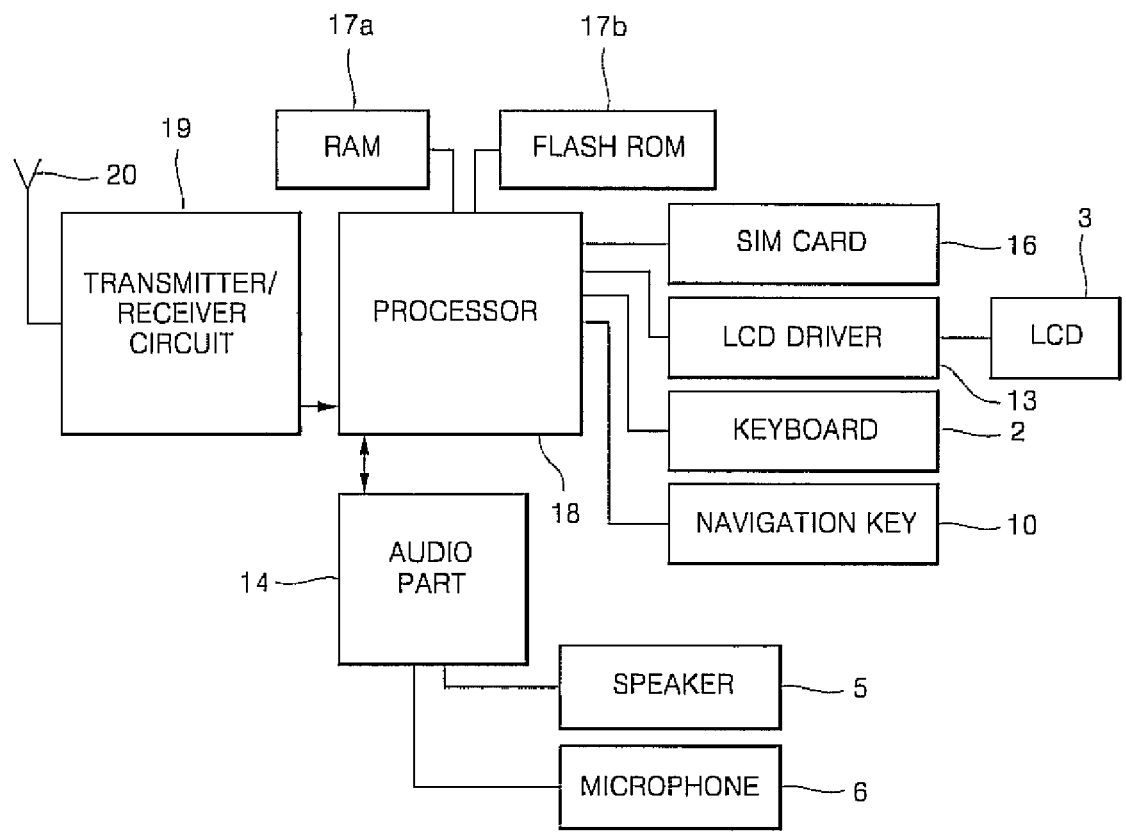
FIG. 3 schematically shows the essential parts of a communication with a cellular or cordless network.

FIG. 3 schematically shows the essential parts of a communication with a cellular or cordless network.

Referring to FIG. 3, the embodiment of the phone of the invention is adapted for use in connection with the GSM 900 MHz and GSM 1800 MHz network, but, of course, the invention may also be applied in connection with other phone networks.

The processor or controller 18 controls the communication with the network via the transmitter/receiver circuit 19 and an antenna 20 that will be discussed in detail below.

The microphone 6 transforms the user's speech into analog signals, the signals formed thereby are A/D converted in an analog/digital (A/D) converter (not shown) before the speech is encoded in an audio part 14. The encoded speech signal is transferred to the processor 18, which, inter alia, supports the GSM terminal software.

The processor 18 also provides the interface to the peripheral units of the apparatus, including a RAM memory 17a and a Flash ROM memory 17b, a SIM card 16, the display 3 and the keypad 2 (as well as data, power supply, etc.).

The audio part 14 speech-decodes the signal, which is transferred from the processor 18 to the earpiece 5 via a digital/analog (D/A) converter (not shown).

Figure 4:
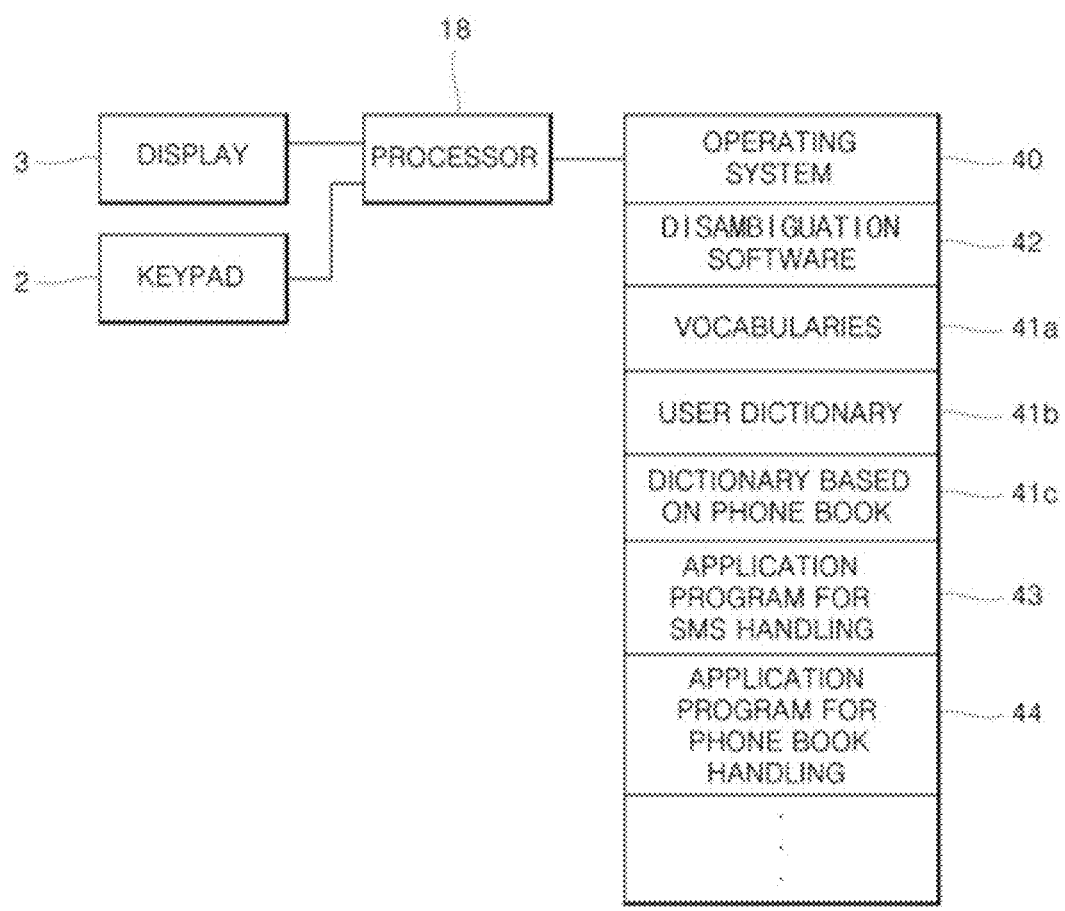
FIG. 4 schematically shows the major components of the predictive editor according to an embodiment of the invention.

FIG. 4 shows the major components of the predictive editor according to an embodiment of the invention.

Referring to FIG. 4, the man-machine interface is established by the display 3 and the keyboard 2.

An input device, such as the keyboard 2, is used for inputting or selecting at least one of the contact items via one of the user name or the messaging address in the memory 17. The input device may be one of a keypad or a touch screen for the key button as well as the keyboard 2.

An input device may select at least some of the messaging address of the contact item stored in the memory 17, or input at least some of the messaging address stored or not stored in the memory 17 into the address inputting window of the messaging application. The text input uses a predictive editor algorithm to generate the text containing words matching a string of key strokes input into the input device.

A character or an icon is displayed on the input device and is changed into the character or the icon equal or corresponding to the language stored respective to the input or the selected contact item in the memory 17 after inputting or selecting at least one of the contact items via one of the user name or the messaging address in the memory 17.

Software instructions in the memory 17 comprise an operating system 40, a disambiguation program 42 and its vocabularies 41, and optionally one or more application programs 43, 44.

Target applications programs 43, 44 for the predictive editor used in a handset comprise the electronic phonebook memory, notepad, messages, calendar, and Internet browsing.

For example, an electronic phonebook memory for Target applications programs 43, 44 stores a plurality of contact items and a language respective to each of the contact items, wherein each of the contact items comprises a user name and a messaging address necessary for a messaging application. The detailed usage of an electronic phonebook memory for Target applications programs 43, 44 will be described below in reference to FIG. 5 to FIG. 9. The messaging application comprises one of a short message service (SMS), a multimedia message service (MMS), e-mail, instant messaging (IM), or extended push-to-talk over cellular (PoC) features.

For another example, an electronic phonebook memory for Target applications programs 43, 44 stores a contact item, which comprises a user name and a messaging address necessary for a messaging application. The detailed usage of an electronic phonebook memory for Target applications programs 43, 44 will be described below in reference to FIG. 10.

The messaging address comprises a phone number and the language for the text input is derived from the international code given in the MSISDN or the country code given in the VPLMN country code of the phone number. The messaging address is an e-mail address and the language for the text input is derived from an Internet TLD (Top Level Domain) of the e-mail address.

A display 3 displays the messaging application, which comprises an address window and a text inputting window.

The processor or controller 18 executes instructions and reads and writes data from a memory 17. The controller 18 is configured to perform a text input for the messaging application in accordance with the operation of the input device on the basis of the language stored respective to the input or the selected contact item in the memory 17.

The controller 18 selects a language setting of one of two or more contact items when two or more contact items having different language settings are selected.

Also, the controller 18 is configured to perform a text input into the text inputting window of the messaging application in accordance with the operation of the input device on the basis of the language derived from the messaging address.

According to the embodiment of the invention, the predictive editor ('T9' mode) can be used as an alternative together with, or instead of, the standard or general text editor ('abc' mode) used in handsets. This standard or general editor is also based on a plurality of keys, each of which is associated with several letters. However the individual letter is selected by multi-pressing the key in question.

Data is entered on the keypad 2, which comprises individual alpha-numerical keys 7. Most of these keys 7 have multiple meanings, represented by letters, numbers and symbols printed on the keys. The entered text is shown in the display 3 of the phone.

Figure 5:
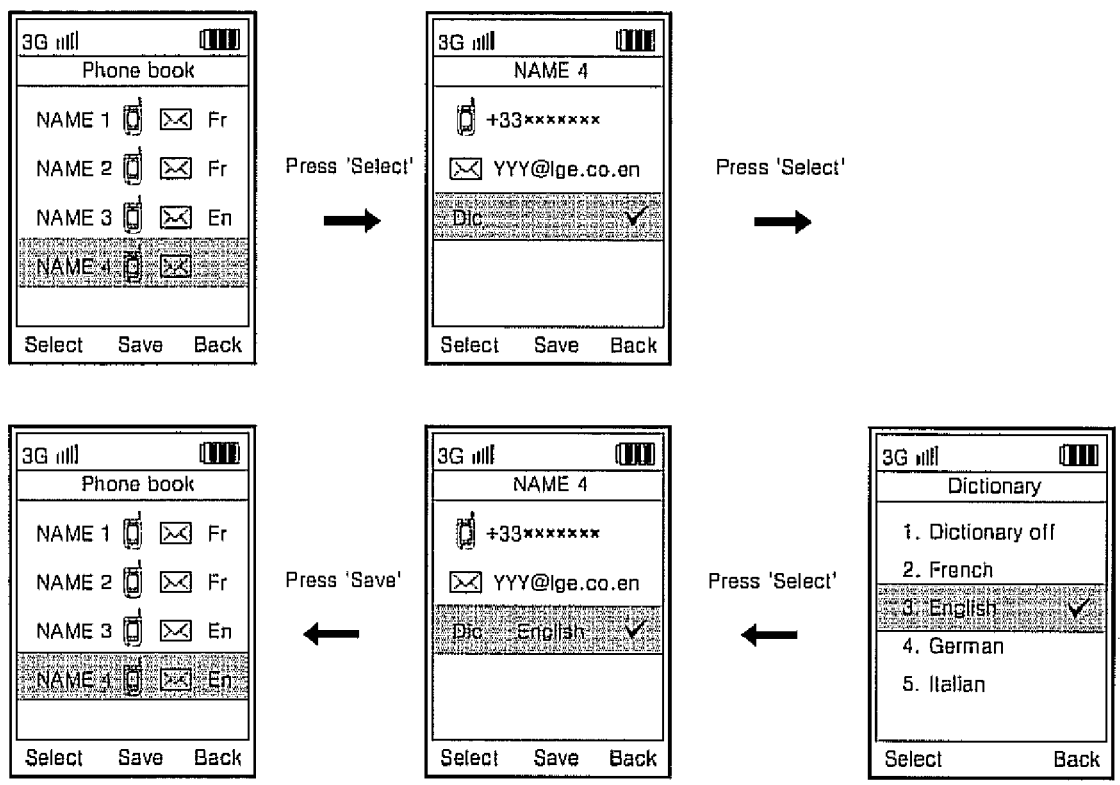
FIG. 5 schematically shows a sequence of displays illustrating a handling of a phonebook in a communication terminal according to an embodiment of the invention.

FIG. 5 schematically shows a sequence of displays illustrating handling of a phonebook in a communication terminal according to an embodiment of the invention.

A phonebook of a communication terminal according to an embodiment of the invention is shown in FIG. 5. When the phonebook is initialized, it waits for a scroll in the first display of FIG. 5. The user can scroll through the list of contact items from the beginning by pressing the up/down navigation key directly. The functionalities of the three soft key labels is 'Select', 'Save' and 'Back'.

Each of the contact items comprises the user name, the phone number, the e-mail address and the language information. The corresponding language respective to the user name is applicable to the text input automatically without user intervention. The language stored in the phonebook can be the language used by the predictive text algorithm.

The way of linking the 'Predictive text algorithm' language with a specific contact item can be implementation dependant.

For example, one method of linking the predictive text algorithm language to the specific contact item is to add a new field in the phonebook Contact item record as follows:

```
Contact_item record
{
    Field 1 : Last Name
    Field 2 : First Name
    Field 3 : Home number
    Field 4 : Mobile number
    Field 5 : E-Mail address
    .....
    Field N : Predictive text algorithm's language
}
End Record
```

The predictive text algorithm developed by Tegic Communications, Inc allows the user to enter ambiguous key strokes into an electronic device. The predictive editor program, named T9®, automatically determines the intended word from all the possible matches. The predictive editor program matches entered keystrokes with completed words from a linguistic database. This concept is the subject for U.S. Pat. No. 5,818,437 and WO 98/33111.

Some solutions will offer the flexibility to allow the user to change a value setting when required.

For example, when pressing the 'Select' soft key on the contact item 'NAME 4', the contact item 'NAME 4' is selected as shown in the second display of FIG. 5. The user can scroll through the list of a phone number, an e-mail address and Dic (which means dictionary) from the beginning by pressing the up/down navigation key directly.

When pressing the 'select' soft key below on the selected 'Dic', the user is offered a list of dictionaries, such as 'Dictionary off', 'French', 'English', 'German', Italian' and so on as shown in the third display of FIG. 5. The user can scroll through the list of dictionaries from the beginning by pressing the up/down navigation key directly.

Once a user moves the scroll bar to a desired language, for example, 'English,' and presses the 'Select' soft key, the 'English' dictionary is selected as shown in the forth display of FIG. 5.

The menu on the phonebook comprises a selected name from the phonebook and a plurality of check boxes, each check box corresponding to a language for the selected name, wherein a user may set a predetermined language for inputting text for a selected user.

When pressing the 'Save' soft key, the dictionary of 'NAME 4' is stored as the 'English' dictionary in the phonebook, as shown in the fifth display of FIG. 5.

In this embodiment, the End User has beforehand selected that the 'Predictive text algorithm' language or the dictionary for contact item 'NAME4' will be set to 'English'. When typing a word for the contact item 'NAME4', a selection of 'Predictive text algorithm' language or dictionary for the contact item 'NAME4' is not necessary.

Figure 6:
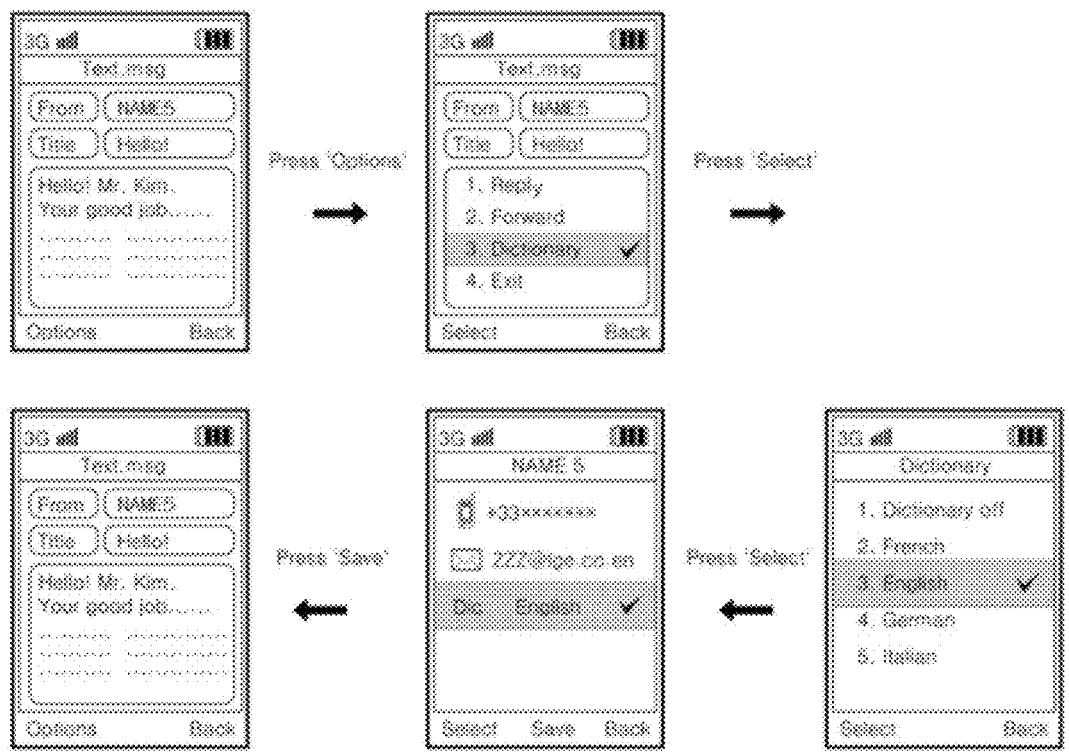
FIG. 6 schematically shows a sequence of displays illustrating handling of a phonebook when the message is received in a communication terminal according to an embodiment of the invention.

FIG. 6 shows a sequence of displays illustrating handling of a phonebook when a message is received in a communication terminal according to an embodiment of the invention.

When the message is received in a communication terminal from the 'NAME5', the received message appears as shown in the first display of FIG. 6. The received message comprises the sender name 'NAME5', the title 'Hello!' and the message contents 'Hello! Mr. KIM. Your good job . . . '. If the contact 'NAME5' item is not stored in the phonebook of the communication terminal, the phone number of the sender appears instead of the sender name 'NAME5'.

When pressing the 'Options' soft key below in the first display of FIG. 6, the user is offered a list of actions, such as 'Reply', 'Forward', 'Dictionary' and 'Exit', as shown in the second display of FIG. 6. The user can scroll through the list of actions from the beginning by pressing the up/down navigation key directly.

When pressing the 'select' soft key below the selected 'Dictionary', the user is offered a list of dictionaries such as 'Dictionary off', 'French', 'English', 'German', 'Italian' and so on in the third display of FIG. 6. The user can scroll through the list of dictionaries from the beginning by pressing the up/down navigation key directly.

Once a user moves the scroll bar to a desired language, for example, 'English' and presses the 'Select' soft key, the 'English' dictionary is selected, as shown in the forth display of FIG. 6.

When pressing the 'Select' soft key, the dictionary of 'NAME 5' is stored as 'English' in the phonebook of a communication terminal as shown in the fourth display of FIG. 6. Finally, when pressing the 'Save' soft key below, the message appears again, as shown in the fifth display of FIG. 6.

In that embodiment, the End User has beforehand selected that the 'Predictive text algorithm' language or the dictionary for contact 'NAME5' item will be set to 'English'. When typing a word for the contact 'NAME5' item, a selection of the 'Predictive text algorithm' language or dictionary for a contact item 'NAME5' is not necessary.

Figure 7:
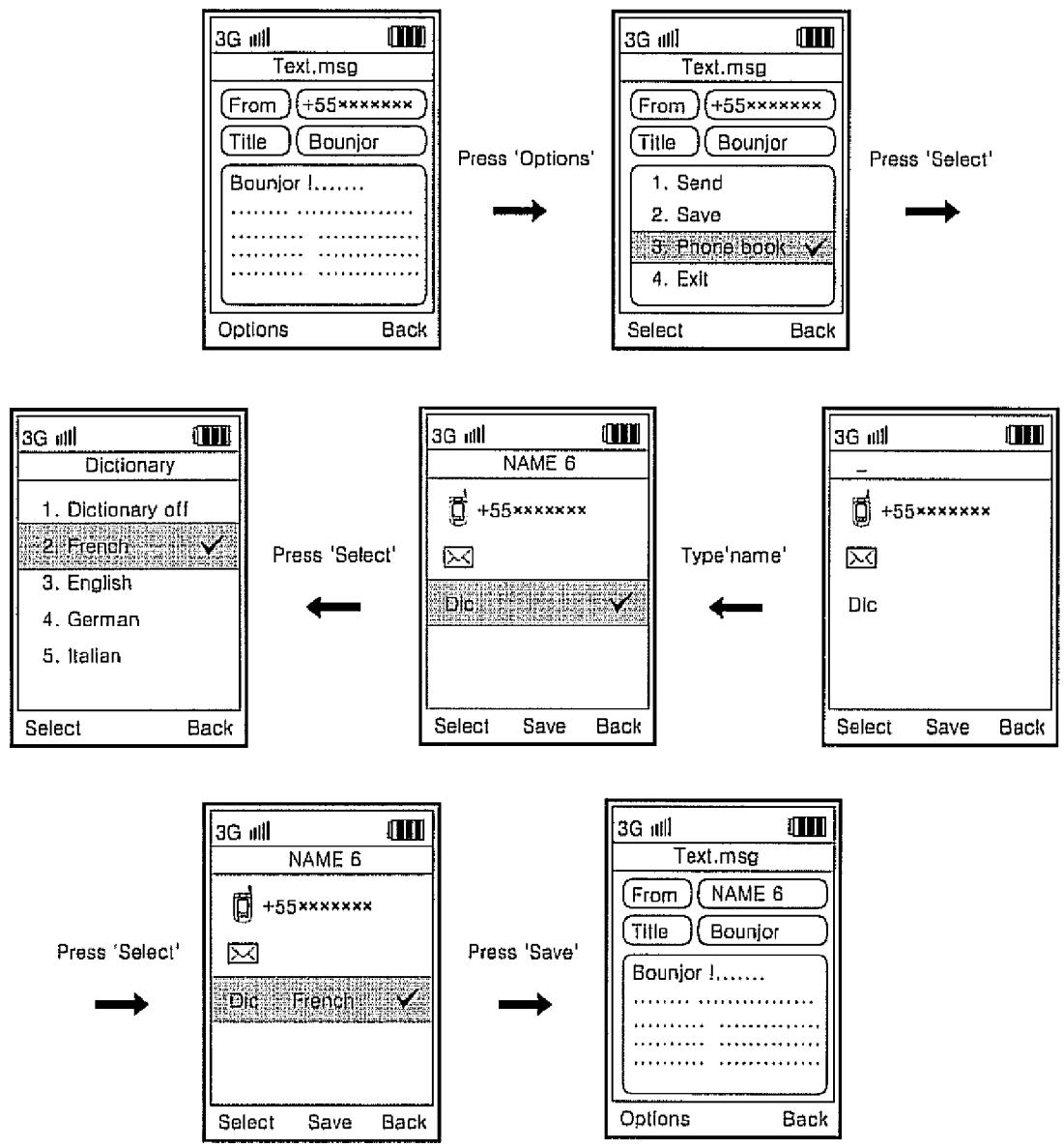
FIG. 7 schematically shows a sequence of displays illustrating handling of a phonebook when the message has been written in a communication terminal according to an embodiment of the invention.

FIG. 7 shows a sequence of displays illustrating handling of a phonebook when the message has been written in a communication terminal according to an embodiment of the invention.

When the message is received in a communication terminal from the phone number '55xxxxx', the sending message appears as shown in the first display of FIG. 7. The sending message comprises the phone number of receiver '55xxxxx', the title 'Bonjour' and the message contents 'Bonjour! . . . '. Because the contact item in this case is not stored in the phonebook of the communication terminal, only the phone number of the receiver appears, instead of the receiver name, in the received message.

When pressing the 'Options' soft key in the first display of FIG. 7, the user is offered a list of actions such as 'Send', 'Save', 'Phonebook' and 'Exit,' as shown in the second display of FIG. 7. The user can scroll through the list of actions from the beginning by pressing the up/down navigation key directly.

When pressing the 'select' soft key on the selected 'Phonebook', the user is offered a phonebook, as shown in the third display of FIG. 7. Because only the phone number is known, a name, an e-mail address and a dictionary does not appear in the third display of FIG. 7. The cursor appears in the name area. When typing a name 'NAME6' in the name area, the typed name appears in the name box, as shown in the forth display of FIG. 7.

The user can scroll through the list of the name, the e-mail address and the dictionary from the beginning by pressing the up/down navigation key directly.

Once a user moves the scroll bar to a desired item, for example, 'Dic,' and presses the 'Select' soft key, the dictionary is selected as shown in the fifth display of FIG. 7.

Once a user moves the scroll bar to a desired language, for example, 'French,' and presses the 'Select' soft key, the dictionary of 'NAME 6' is stored as 'French' in the phonebook of a communication terminal as shown in the fifth display of FIG. 7.

When pressing the 'Select' soft key in the fifth display of FIG. 7, the phonebook appears again with the name 'NAME6' and the dictionary 'French' is set, as shown in the sixth display of FIG. 7.

Finally, when pressing the 'Save' soft key, the sending message appears again, as shown in the seventh display of FIG. 7. When the sending message appears again, NAME6 is displayed in the 'from' field, as shown in the seventh display of FIG. 7, instead of the phone number, as shown in the first display of FIG. 7.

In this embodiment, the End User has beforehand selected that the 'Predictive text algorithm' language or the dictionary for contact 'NAME6' item will be set to 'French'. When typing a word for the contact 'NAME6' item, selecting the 'Predictive text algorithm' language or the dictionary for contact item 'NAME6' is skipped.

Figure 8:
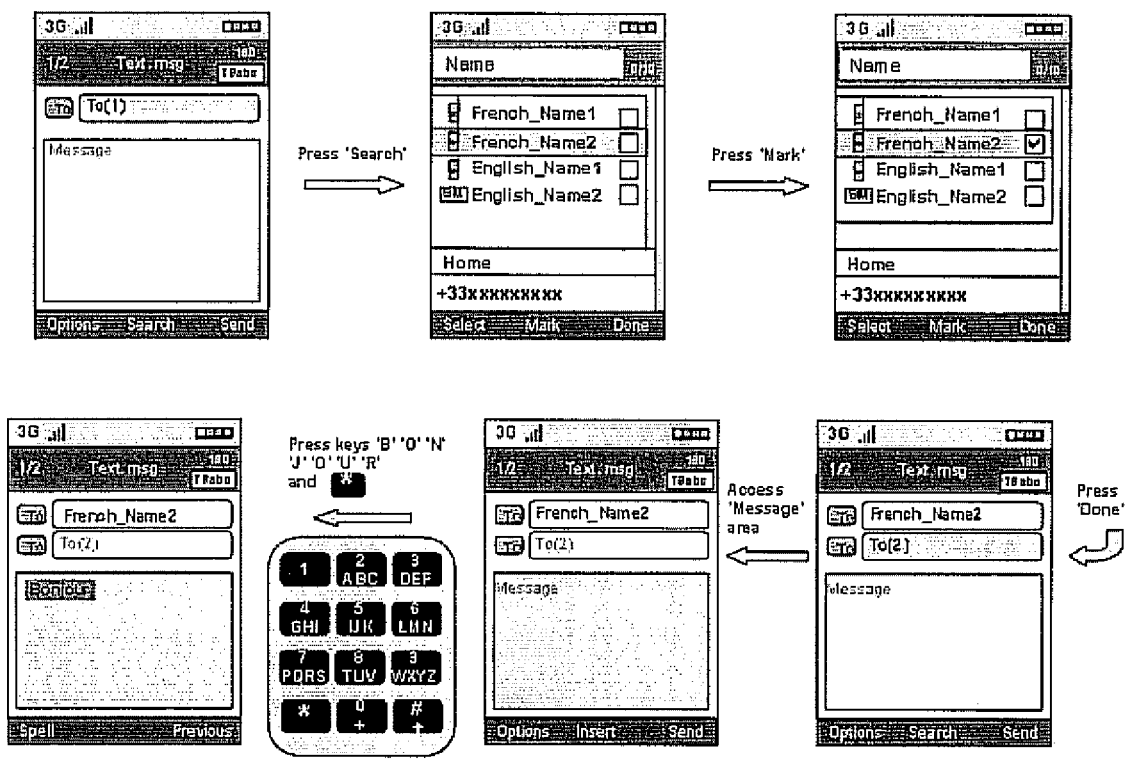
FIG. 8 schematically shows a sequence of displays illustrating all user operations in a communication terminal using a messaging application according to an embodiment of the invention.

FIG. 8 schematically shows a sequence of displays illustrating all user operations in a messaging application in a communication terminal according to an embodiment of the invention.

When the End User wants to send a new message (SMS, MMS, E-Mail or other type) to an existing contact available in its phonebook or reply to existing one, he will not have to 'take care' of the predictive text algorithm language in order for the predictive text algorithm language to be applied.

When the user wants to send a new message, a messaging application is initialized, as shown in the first display of FIG. 8. The functionalities of the three soft key labels are 'Options', 'Search' and 'Send'.

Figure 9:
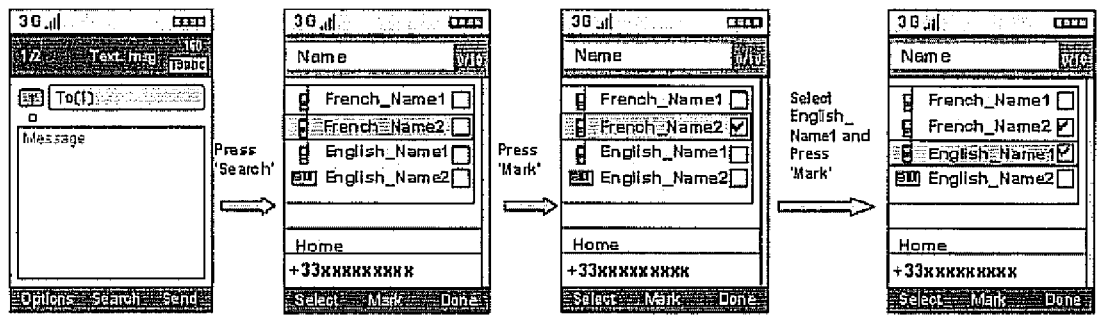
FIG. 9 schematically shows a sequence of displays illustrating all user operations in a communication terminal using a messaging application according to another embodiment of the invention.
Figure 9:
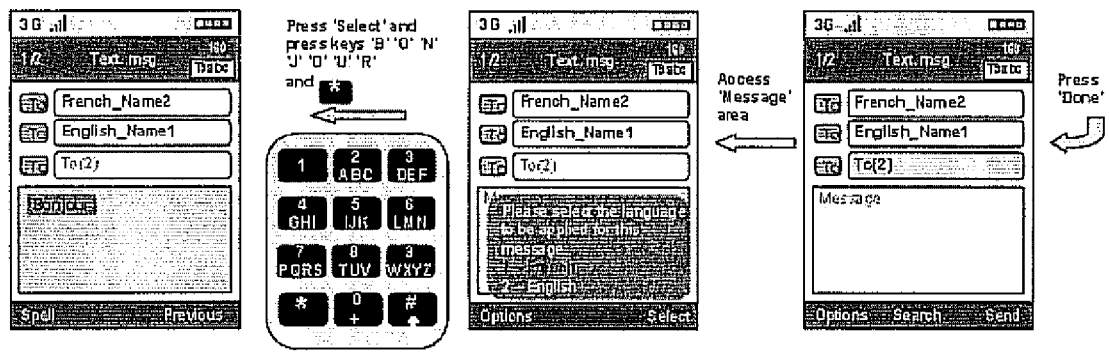

When pressing the 'Search' soft key, the user is offered a list of user names, as shown in the second display of FIG. 9. The functionalities of the three soft key labels change from 'Options', 'Search' and 'Send' to 'Select', 'Mark' and 'Done'. The user can scroll through the list of user names from the beginning by pressing the up/down navigation key directly. Once the user has found the required entry and pressed the 'Mark' soft key, the required entry is selected, as shown in the third display of FIG. 8.

When pressing the 'Done' soft key, the selected name is entered into the address area, as shown in the fourth display of FIG. 8.

The End User has beforehand selected that the 'Predictive text algorithm' language or the dictionary for contact item 'French_Name2' will be set to 'French'. When starting to type a word in the message area, the user presses the key containing the desired letter once. For example, when pressing the keys containing 'B', 'O', 'N', 'J', 'O', 'U' and 'R' once, the user can type the word 'Bonjour'.

Therefore, a selection of the 'Predictive text algorithm' language or the dictionary for the contact item 'French_Name2' is not necessary.

FIG. 9 schematically shows a sequence of displays illustrating all user operations in a messaging application in a communication terminal according to another embodiment of the invention.

When multiple contacts available in the phonebook are to be selected, this embodiment of the invention allows the End User to select the most relevant language in accordance with the selected contacts.

The first to the third displays of FIG. 9 are equal to the first to the third displays of FIG. 8.

When selecting contact item 'English_Name1' at the same time and pressing the 'Mark' soft key, the additional entry is selected, as shown in the fourth display of FIG. 9.

When pressing the 'Done' soft key, the selected names are entered into the address area, as shown in the fifth display of FIG. 9. The End User has beforehand selected that the 'Predictive text algorithm' language or the dictionary for contact item 'French_Name2' will be set to 'French' and the language or the dictionary for contact item 'English_Name1' is set to 'English'.

When accessing the message area, the pop-up message automatically appears for selecting the language to be applied for this message from 'French' and 'English'.

When 'French' is selected to be applied for this message, the user can type the word 'Bonjour' by using the navigation key and pressing the keys containing 'B', 'O', 'N', 'J', 'O', 'U' and 'R' once.

The End User can decide not to apply the choice given in the pop-up message and return to general language selection by accessing the 'Options' menu.

Figure 10:
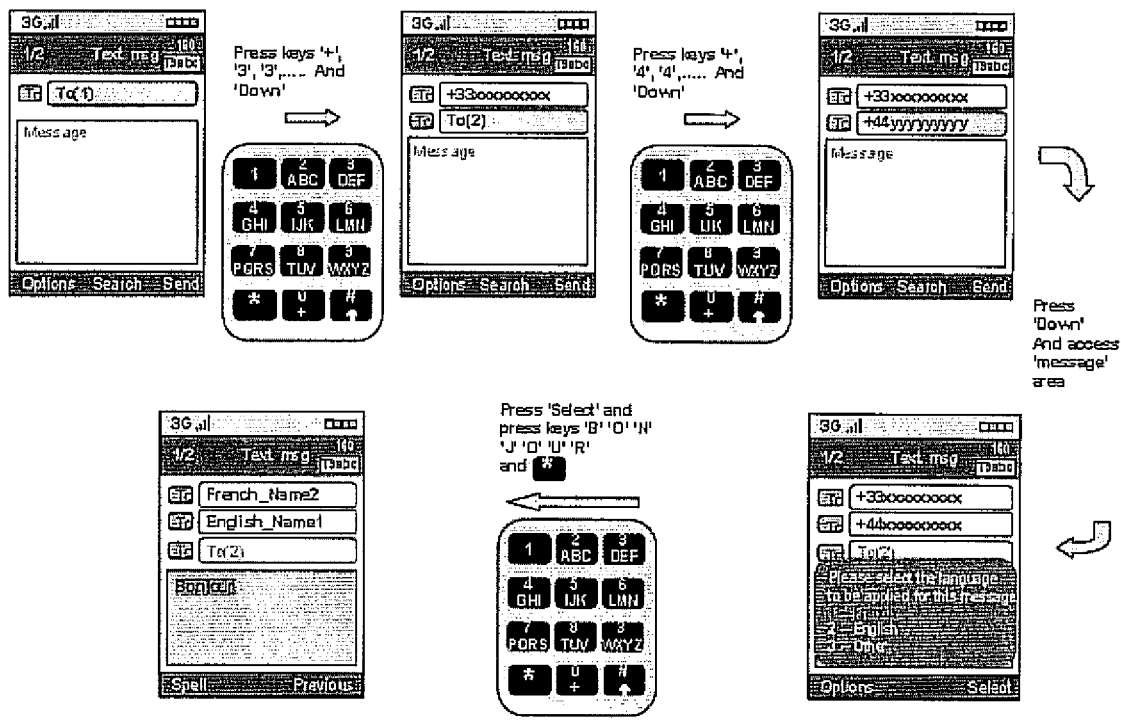
FIG. 10 schematically shows a sequence of displays illustrating all user operations in a communication terminal using a messaging application according to another embodiment of the invention.

FIG. 10 schematically shows a sequence of displays illustrating all user operations in a messaging application in a communication terminal according to another embodiment of the invention.

When the End User wants to send a message to a recipient not stored as a contact item in the phonebook, another embodiment according to the invention will allow the user to select a priority for the predictive text algorithm language based on the MSISDN (Mobile Station International Subscriber Directory Number) (SMS, MMS application) or the internet Top Level Domain (TLD) of the E-Mail address (MMS, E-Mail application) selected by the End User.

In case the End User does not specify the internal code of the MSISDN (local number), the selected language can be derived from the VPLMN (Visited Public Land Mobile Network) country code.

When the End User wants to send a new message to a contact that does not exist in its phonebook, a messaging application is initialized, as shown in the first display of FIG. 10. The functionalities of the three soft key labels are 'Options', 'Search' and 'Send'.

When typing phone numbers of two receivers that are different from each other in the address area and accessing the message area directly in the second and the third displays of FIG. 10, the pop-up message for selecting the language to be applied for this message from 'French', 'English' and 'other' automatically appears. These languages are derived from the international code given in the MSISDN. In case the End User does not specify the internal code of the MSISDN (local number), the selected language can be derived from the VPLMN county code.

If the e-mail addresses, instead of the phone number of the receivers, are input into the address area, these languages can be derived from the Internet Top Level Domain (TLD) of the e-mail address entered by the end user.

When 'French' is selected to be applied for this message, the user can type the word 'Bonjour' by using the navigation key and pressing the keys containing 'B', 'O', 'N', 'J', 'O', 'U' and 'R' once.

If the end user decides to select 'Other' as the language, then two alternative methods can apply as follows. If the action has the same effect as selecting the 'Options' key, the end user will return to the general language selection by accessing the 'Options' menu. Also, a new pop-up notification will be given to the user that will only include remaining 'predictive text algorithms' languages supported by the handset other than those displayed using the mechanism used and described in this embodiment.

This invention applies to all mobile devices that embed applications that will use any 'predictive text algorithms' that use dictionaries of foreign languages and the following data: MSISDN, E-Mail addresses, SIP addresses or contact items stored in the address book ((U)SIM, handset).

It will at least comprise 'Messaging' applications and the following messages types: SMS, MMS, E-Mail, IM or extended PoC (Push to talk over Cellular) features that may include text media.

The above embodiments of the invention describe that the predictive text algorithm mode ('T9' mode) and the language of the predictive text algorithm is applied for text input. But the invention is not limited to the above embodiments. What is called 'abc' mode and general language can be applied. The 'abc' mode allows you to enter letters by pressing the key labeled with the required letter once, twice, three, or four times until the letter is displayed as described above.

The language derived from the content of the message is automatically selected respective to the sender of the received message. For example, if the received message is written in 'English', the language of this sender automatically is selected and stored as "English" in the phonebook in addition to the name, the phone number and the e-mail address.

The End User can change 'T9' and 'abc' modes by pressing and holding down the special key. When this key is pressed and held down, the available modes are displayed on the screen of the display.

The embodiments of the present invention have been described for illustrative purposes and those skilled in the art will appreciate that various modifications, additions and substitutions are possible without departing from the scope and spirit of the invention as disclosed in the accompanying claims. Therefore, the scope of the present invention should be defined by the appended claims and their legal equivalents.

What is claimed is:

1. A method of managing a language for text input in a mobile terminal, the method comprising:
receiving a first message from a sender;
displaying a messaging application including the received first message on a display of the mobile terminal;
receiving an input for displaying a menu for managing the language for the text input via an input unit of the mobile terminal comprising a touch screen while the received first message is displayed on the display;
displaying the menu for managing the language for the text input on the display in response to the input;
selecting and displaying the language related to the sender for the text input from the menu with or without input by a user;

storing contact information comprising a name of the sender and the selected language in a memory, wherein the selected language is applicable to the text input for the sender, wherein the selecting and displaying the language related to the sender comprises at least:

determining a second language from content of the received first message, wherein the language related to the sender is automatically selected and displayed in the menu based on the determined second language without input by the user; or determining a third language based on a messaging address of the sender in the received first message, wherein the language related to the sender is automatically selected and displayed in the menu based on the determined third language without input by the user;

displaying, on the display, a first address inputting window of the messaging application for receiving recipient information;

displaying a name or a messaging address of a first recipient in the first address inputting window in response to an input received via the input unit for entering first recipient information for a second message to be transmitted from the mobile terminal to the first recipient; and displaying, on the touch screen, a keyboard including a plurality of characters from a character set corresponding to a language related to the first recipient based on the displayed name or messaging address of the first recipient, wherein the language related to the first recipient is derived from:

the messaging address of the first recipient displayed in the first address inputting window when the first recipient has not been stored as a contact item in a phonebook of the mobile terminal, the messaging address of the first recipient comprising a phone number or an e-mail address; and a language set for the first recipient when the first recipient information is stored in the phonebook and the first recipient information includes the language set for the first recipient.

2. The method of claim 1, wherein the selected language related to the sender is used as a language for a predictive text algorithm, changing the predictive text algorithm language from a default language to the selected language causes the predictive text algorithm to run in the selected language, and the predictive text algorithm generates text containing words matching a string of key strokes input via a keypad of the mobile terminal, which allows words of the text input to be entered with only one keystroke per letter.

3. The method of claim 1, wherein the messaging address of the sender comprises a phone number and the language for the text input is derived from an international code given in a Mobile Station International Subscriber Directory Number (MSISDN) or a country code given in a Visited Public Land Mobile Network (VPLMN) country code for the phone number.

4. The method of claim 1, wherein the messaging address of the sender comprises an e-mail address and the language for the text input is derived from an Internet TLD (Top Level Domain) of the e-mail address.

5. The method of claim 1, wherein the messaging application comprises a short message service (SMS), a multimedia message service (MMS), e-mail, instant messaging (IM) or extended push-to-talk over cellular (PoC) features.

6. The method of claim 1, wherein the input unit further comprises a keypad having a display area, the method further comprising:

displaying, on the display, a window for composing a new message to be sent to the sender;

displaying, at the display area of the keypad, a character or an icon from a character set corresponding to the stored selected language related to the sender.

7. The method of claim 6, wherein the keypad comprises a plurality of alpha-numerical keys.

8. The method of claim 1, wherein the selecting and displaying the language related to the sender further comprises selecting and displaying a different language by changing the automatically selected language to the different language.

9. The method of claim 1, further comprising:

automatically displaying a second address inputting window of the messaging application on the display when the entry of the first recipient information is completed and the name or the messaging address of the first recipient is displayed in the first address inputting window.

10. The method of claim 9, further comprising:

displaying a name or a messaging address of a second recipient in the second address inputting window in response to an input received via the input unit for entering second recipient information for the second message to be transmitted from the mobile terminal to the first and second recipients; and displaying a list including the language related to the first recipient and a language related to the second recipient when the language related to the first recipient and the language related to the second recipient are different.

11. The method of claim 10, further comprising:

receiving an input for selecting one language from the list; and displaying, on the touch screen, a keyboard including a plurality of characters from a character set corresponding to the selected one language in response to the input for selecting one language.

12. The method of claim 10, wherein the list is displayed as a pop-up message.

13. The method of claim 10, wherein the list further includes a third language in addition to the language related to the first recipient and the language related to the second recipient.

14. A method of transmitting a text message in a mobile terminal, the method comprising:

receiving at least one message from at least one of a plurality of contacts;

displaying a messaging application including the at least one received message on a display of the mobile terminal;

receiving an input for displaying a menu for managing a language for text input related to the displayed at least one message via an input unit of the mobile terminal comprising a touch screen while the received at least one message is displayed on the display;

displaying the menu on the display in response to the input for displaying the menu, wherein the menu includes a language automatically selected based on a language used in content of the at least one message received, the automatically selected language being changeable in response to user input for selecting a different language;

storing, in a memory of the mobile terminal, contact information and the selected language for the at least one of the plurality of contacts, the contact information including a name and a messaging address of the at least one of the plurality of contacts that are necessary for the messaging application;

receiving an input for selecting the at least one of the plurality of contacts via the name or the messaging address of the at least one of the plurality of contacts to transmit a new message to the at least one of the plurality of contacts;

displaying, on the touch screen, a keyboard including a plurality of characters from a character set corresponding to the selected language stored for the selected at least one of the plurality of contacts based on the at least one of the plurality of contacts selected via the name or the messaging address;

receiving, via the displayed keyboard, text input in the selected language, the received text being included in the new message; and transmitting the new message to the at least one of the plurality of contacts.

15. The method of claim 14, wherein two or more of the plurality of contacts are selected and at least one of the selected contacts has a different language setting than another selected contact, the method further comprising:

selecting the language setting of one of the two or more of the plurality of contacts.

16. The method of claim 14, wherein the selected language is used as a language for a predictive text algorithm, changing the predictive text algorithm language from a default language to the selected language causes the predictive text algorithm to run in the selected language, and the predictive text algorithm generates text containing words matching a string of key strokes input via a keypad of the mobile terminal, which allows words of the text to be entered with only one keystroke per letter.

17. The method of claim 16, wherein a character or an icon from a character set corresponding to the selected language for the at least one of the plurality of contacts is displayed in a display area of the keypad.

18. The method of claim 14, wherein the messaging application comprises a short message service (SMS), a multimedia message service (MMS), e-mail, instant messaging (IM) or extended push-to-talk over cellular (PoC) features.

19. A method of transmitting a text message in a mobile terminal, the method comprising:

receiving at least one message from at least one of a plurality of contacts;

receiving an input for displaying a menu for managing a language for text input via an input unit of the mobile terminal comprising a touch screen while the received message is displayed on a display of the mobile terminal;

displaying the menu on the display in response to the input for displaying the menu, wherein the menu includes a language automatically selected based on a messaging address of the at least one of the plurality of contacts, the automatically selected language being changeable in response to user input for selecting a different language;

storing, in a memory of the mobile terminal, contact information for the at least one of the plurality of contacts, the contact information including a name and a messaging address necessary for a messaging application;

displaying the messaging application on the display, the messaging application including an address input window and a text input window;

receiving an input for selecting the messaging address of the at least one of the plurality of contacts stored in the memory or an input of at least a portion of the messaging address of the at least one of the plurality of contacts at the address input window of the messaging application to transmit a new message to the at least one of the plurality of contacts;

displaying, on the touch screen, a keyboard including a plurality of characters from a character set corresponding to the selected language stored for the one of the plurality of contacts based on the selected messaging address or the received at least a portion of the messaging address;

receiving, via the displayed keyboard, text input in the selected language, the received text being included in the new message; and transmitting the new message to the at least one of the plurality of contacts.

20. The method of claim 19, wherein the messaging address comprises a phone number and the language for the text is derived from an international code given in a Mobile Station International Subscriber Directory Number (MSISDN) or a country code given in a Visited Public Land Mobile Network (VPLMN) country code for the phone number.

21. The method of claim 19, wherein the messaging address comprises an e-mail address and the language for the text is derived from an Internet TLD (Top Level Domain) of the e-mail address.

22. The method of claim 19, wherein the mobile terminal includes a controller configured to use a predictive editor algorithm to generate the text containing words matching an input string of key strokes.

23. The method of claim 19, wherein the messaging application comprises a short message service (SMS), a multimedia message service (MMS), e-mail, instant messaging (IM) or extended push-to-talk over cellular (PoC) features.

24. A mobile terminal, comprising:

a transmitter/receiver configured to receive at least one message from at least one of a plurality of contacts;

a display configured to display a messaging application including the at least one received message;

an input device comprising a touch screen and configured to receive an input for displaying a menu for managing a language for text input related to the displayed at least one message while the received at least one message is displayed on the display;

a controller configured to cause displaying of the menu on the display in response to the input for displaying the menu, wherein the menu includes a language automatically selected based on the language used in content of the at least one message received, the automatically selected language being changeable in response to user input for selecting a different language; and a memory configured to store contact information and the selected language for the at least one of the plurality of contacts, the contact information including a name and a messaging address that are necessary for the messaging application, wherein:

the input device is further configured to receive an input for selecting the at least one of the plurality of contacts by the name or the messaging address of the at least one of the plurality of contacts to transmit a new message to the at least one of the plurality of contacts;

the controller is further configured to cause displaying, on the touch screen, of a keyboard including a plurality of characters from a character set corresponding to the selected language stored in the memory for the selected at least one of the plurality of contacts based on the at least one of the plurality of contacts selected via the name or the messaging address;

the displayed keyboard is configured to receive text input and the received text is displayed on the display in the selected language, the received text being included in the new message; and the transmitter/receiver is further configured to transmit the new message with the text in the selected language to the at least one of the plurality of contacts.

25. The mobile terminal of claim 24, wherein the input device is further configured to receive a selection of two or more of the plurality of contacts and at least one of the selected contacts has a different language setting than another selected contact, and the controller is further configured to select the language setting of one of the two or more of the plurality of contacts.

26. The mobile terminal of claim 23, wherein the selected language is used as a language for a predictive text algorithm, changing the predictive text algorithm language from a default language to the selected language causes the predictive text algorithm to run in the selected language, and the predictive text algorithm generates text containing words matching a string of key strokes input via a keypad of the mobile terminal, which allows words of the text to be entered with only one keystroke per letter.

27. The mobile terminal of claim 24, wherein the controller is further configured to change a character or an icon displayed on the input device into a character or icon corresponding to the language stored according to the input or the selected contact in the memory after inputting or selecting the at least one of the plurality of contacts.

28. The mobile terminal of claim 24, wherein the messaging application comprises a short message service (SMS), a multimedia message service (MMS), e-mail, instant messaging (IM) or extended push-to-talk over cellular (PoC) features.

29. A mobile terminal comprising;
a transmitter/receiver configured to receive at least one message from at least one of a plurality of contacts;
a display configured to display a messaging application including the received at least one message;
an input device comprising a touch screen and configured to receive an input for displaying a menu for managing a language for text input while the received at least one message is displayed on the display such that the display displays the menu in response to the input for displaying the menu;
a controller configured to select the language related to the at least one of the plurality of contacts automatically based on a messaging address of the received at least one message, wherein the automatically selected language is displayed in the menu and changeable in response to user input for selecting a different language; and
a memory configured to store contact information for the at least one of the plurality of contacts, the contact information including a name and a messaging address necessary for the messaging application, wherein:
the display is further configured to display the messaging application including an address input window and a text input window;

the input device is further configured to receive selection of the messaging address of the at least one of the plurality of contacts or input of at least a portion of the messaging address of the at least one of the plurality of contacts stored in the memory to be entered into the address input window of the messaging application to transmit a new message to the at least one of the plurality of contacts;

the controller is further configured to recognize the selected messaging address or received at least a portion of the messaging address and cause displaying, on the touch screen, of a keyboard including a plurality of characters from a character set corresponding to the selected language stored for the one of the plurality of contacts based on the recognized messaging address or at least a portion of the messaging address;

the displayed keyboard is configured to receive text input in the selected language, the received text being included in the new message; and the transmitter/receiver is further configured to transmit the new message to the at least one of the plurality of contacts.

30. The mobile terminal of claim 29, wherein the messaging address comprises a phone number and the language for the text is derived from an international code given in a Mobile Station International Subscriber Directory Number (MSISDN) or a country code given in a Visited Public Land Mobile Network (VPLMN) country code for the phone number.

31. The mobile terminal of claim 29, wherein the messaging address comprises an e-mail address and the language for the text is derived from an Internet TLD (Top Level Domain) of the e-mail address.

32. The mobile terminal of claim 29, wherein the controller is further configured to use a predictive editor algorithm to generate the text containing words matching an input string of key strokes of the input device.

* * * * *